United States Patent
Herbstreit et al.

(10) Patent No.: US 7,149,628 B2
(45) Date of Patent: Dec. 12, 2006

(54) METHODS AND SYSTEMS FOR PREDICTING FUEL SENSOR PERFORMANCE WITHIN A TANK DURING MOTION

(75) Inventors: Michael E. Herbstreit, St. Louis, MO (US); Anthony D. Tompras, Chesterfield, MO (US); Edward J. Levinskas, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 10/764,802

(22) Filed: Jan. 26, 2004

(65) Prior Publication Data

US 2005/0165563 A1 Jul. 28, 2005

(51) Int. Cl.
G01F 17/00 (2006.01)
(52) U.S. Cl. .................. 702/5 J; 702/57; 702/100; 702/138; 703/7
(58) Field of Classification Search .......... 702/54, 702/55, 52, 50, 100, 138; 73/290 B, 290 R, 73/290 V, 291, 292, 296, 304 C, 304 R; 703/7, 703/8, 9, 10
See application file for complete search history.

(56) References Cited

U.S. PATENT DOCUMENTS

| | | | |
|---|---|---|---|
| 4,258,422 A * | 3/1981 | Dougherty et al. ......... 701/123 |
| 4,262,531 A | 4/1981 | Hewitt et al. |
| 4,441,157 A | 4/1984 | Gerchman et al. |
| 4,553,216 A | 11/1985 | Stevens et al. |
| 4,908,783 A | 3/1990 | Maier |
| 5,138,559 A | 8/1992 | Kuehl et al. |
| 5,207,099 A | 5/1993 | Baker |
| 5,345,811 A | 9/1994 | Alexandrovich, Sr. et al. |
| 5,350,405 A * | 9/1994 | Silvian .................... 607/8 |
| 6,125,882 A | 10/2000 | Kong |
| 6,231,009 B1 | 5/2001 | Kong |
| 6,698,692 B1 | 3/2004 | Tichenor et al. |
| 6,715,349 B1 * | 4/2004 | Atkinson .................. 73/304 R |

* cited by examiner

Primary Examiner—Michael Nghiem
Assistant Examiner—Stephen J. Cherry
(74) Attorney, Agent, or Firm—Lee & Hayes, PLLC

(57) ABSTRACT

Methods and systems for predicting fuel sensor performance during motion are disclosed. In one embodiment, a method includes receiving tank geometry information, receiving sensor configuration information, and receiving tank motion information. The method then computes a fuel (surface) plane-to-sensor intersection for at least one tank position based on the tank motion information, and also computes a wetted volume at every fuel (surface) plane-to-sensor intersection for each sensor location based on the sensor configuration information. Finally, the method computes a fuel quantity at every fuel (surface) plane-to-sensor intersection based on a sum of the wetted volumes.

25 Claims, 6 Drawing Sheets

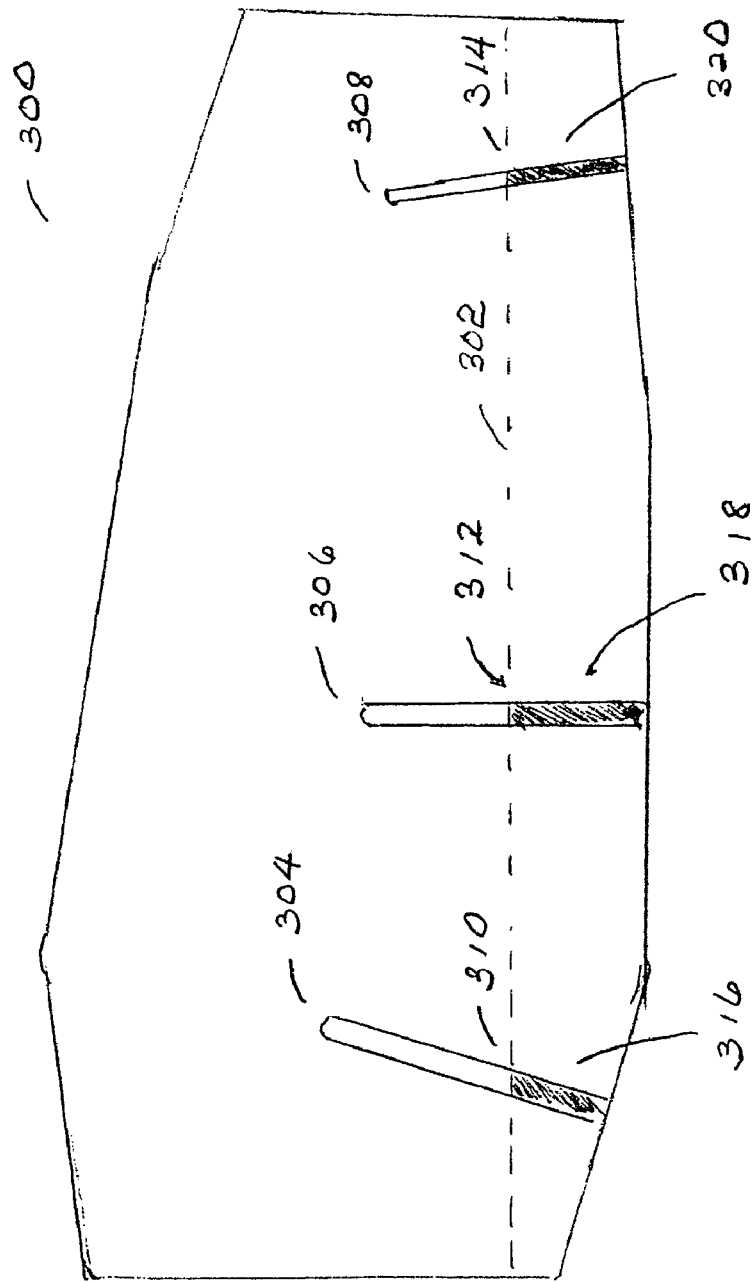

METHODS AND SYSTEMS FOR PREDICTING FUEL SENSOR PERFORMANCE WITHIN A TANK DURING MOTION

FIELD OF THE INVENTION

The present disclosure relates to measurement systems, and more specifically, to methods and systems for predicting the accuracy of information supplied by sensors within fuel or other liquid tanks experiencing motion with six degrees of freedom.

BACKGROUND OF THE INVENTION

Fuel sensors may be placed within the fuel tanks of aircraft in order to approximate the amount of fuel remaining in the tanks. During flight, the aircraft, along with the fuel tanks and the fuel within the tanks, may experience motion throughout six degrees of freedom (including pitch, roll, and yaw). For some types of aircraft, including high performance fighter aircraft, the fuel within the tanks may be subject to very high velocities and very large gravitational forces, thus causing the fuel within the tanks to shift substantially within the tanks. The placement of the sensors within the fuel tanks may therefore be critical to the accuracy of the fuel measurements, particularly during such extreme flight conditions.

Conventional methods of determining the placement of the sensors within the fuel tanks depend upon trial-and-error techniques. For example, a designer may make a "best guess" placement of the sensors within the fuel tanks. This initial design is then built and tested in a test fixture that simulates actual flight conditions and measures the performance. If this initial design does not provide the required degree of accuracy, the locations of the sensors may be adjusted, and the testing process repeated, until a satisfactory result is obtained.

Although desirable results have been achieved using such conventional methods, the trial-and-error method of determining the locations of the fuel sensors may be expensive, particularly for designs that require a relatively large number of iterations to achieve acceptable sensor locations. The repeated design, fabrication, and testing of fuel tank designs may involve considerable labor costs and may take a substantial amount of time to complete as well. Novel methods for predicting the accuracy of information supplied by sensors within fuel tanks that may reduce or eliminate the expense of the conventional trial-and-error methods would therefore be useful.

SUMMARY OF THE INVENTION

The present invention relates to methods and systems for predicting the accuracy of the information supplied by sensors within fuel tanks experiencing motion with six degrees of freedom. Apparatus and methods in accordance with the present invention may advantageously allow a designer to rapidly perform computational simulations for a variety of system configurations, sensor configurations, etc. that predict the accuracy of information supplied by sensors within fuel tanks experiencing motion with six degrees of freedom. Thus, improved system designs may be achieved at lower cost in comparison with state-of-the-art trial-and-error methods.

In one embodiment, a method of determining a volume of liquid within a tank during motion includes receiving tank geometry information, receiving sensor configuration information, and receiving tank motion information. The method then computes a fuel (surface) plane-to-sensor intersection for at least one tank position based on the tank motion information, and also computes a wetted volume at every fuel (surface) plane-to-sensor intersection for each sensor location based on the sensor configuration information. Finally, the method computes a fuel quantity at every fuel (surface) plane-to-sensor intersection based on the sum of the wetted volumes. In further embodiments, the method may also include determining a computational error, and comparing that error with at least one previously computed error to determine an optimized sensor configuration.

BRIEF DESCRIPTION OF THE DRAWINGS

The preferred and alternative embodiments of the present invention are described in detail below with reference to the following drawings.

FIG. 3 is a side elevational view of a fuel tank having a plurality of sensors.

DETAILED DESCRIPTION OF THE INVENTION

Figure 1A:
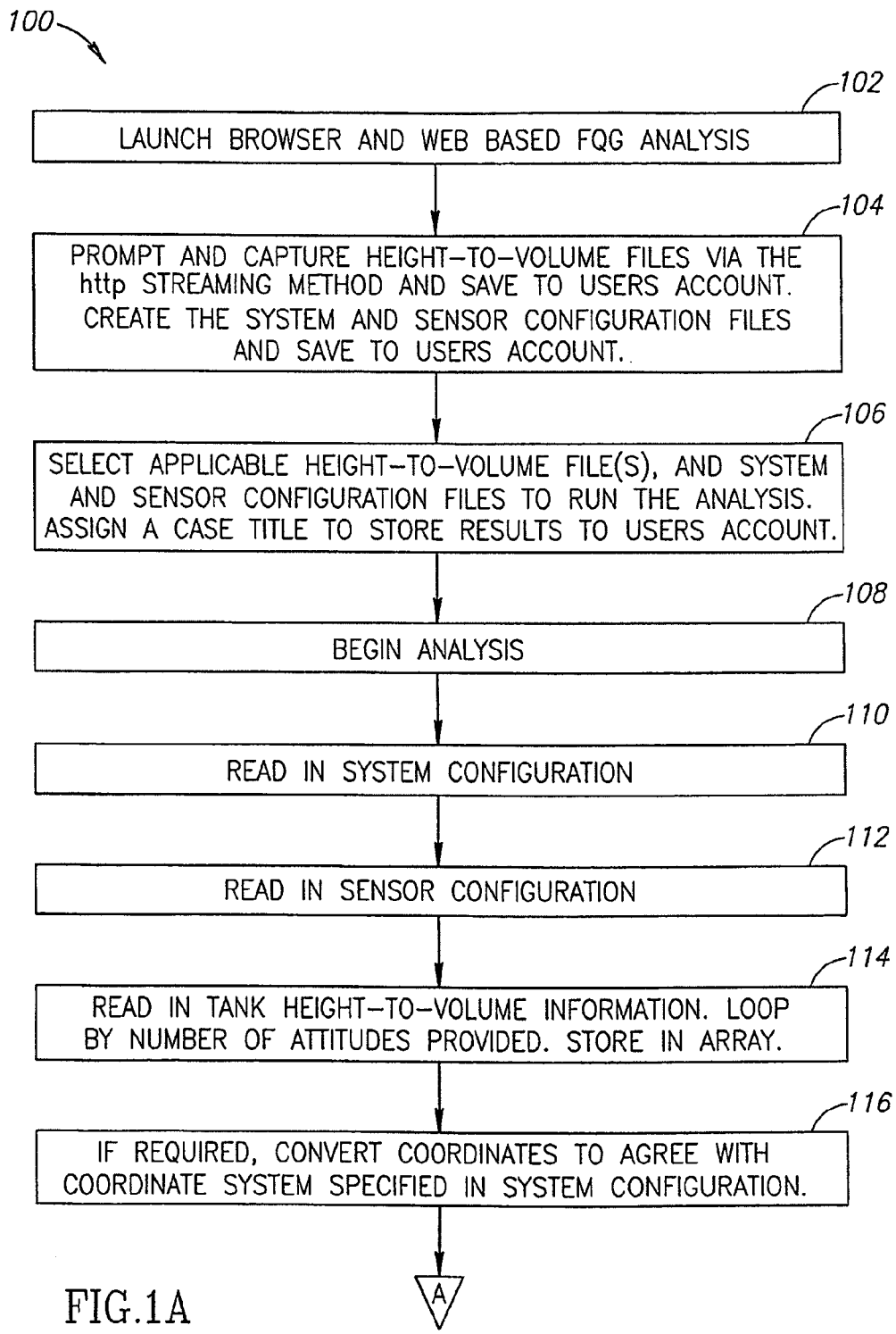
FIGS. 1A through 1D show a flow chart of a method of predicting the accuracy of information supplied by sensors within fuel tanks during motion in accordance with an embodiment of the invention.

The present invention relates to methods and systems for predicting the accuracy of information supplied by sensors within fuel tanks experiencing motion with six degrees of freedom. Many specific details of certain embodiments of the invention are set forth in the following description and in FIGS. 1–2 to provide a thorough understanding of such embodiments. One skilled in the art, however, will understand that the present invention may have additional embodiments, or that the present invention may be practiced without several of the details described in the following description.

In general, embodiments of the present invention may allow a designer to rapidly perform computational simulations to predict the accuracy of information supplied by sensors within fuel tanks experiencing motion with six degrees of motion. Accordingly, the designer may quickly and efficiently perform optimization studies of various sensor configurations until a satisfactory or optimal configuration is determined. Embodiments of the present invention may advantageously reduce or eliminate the relatively higher costs associated with trial-and-error experimental studies, and may provide improved system designs at lower cost in comparison with conventional state-of-the-art trial-and-error methods.

FIGS. 1A through 1D show a flow chart of a method 100 of predicting the accuracy of information supplied by sensors 304, 306, 308 within a fuel tanks 300 (FIG. 3) experiencing motion in accordance with an embodiment of the invention. In this embodiment, the method 100 is initiated at block 102 by launching a web-based browser application. At a block 104, one or more height-to-volume files are input into the analysis program, along with one or more files defining the geometric definition of the fuel tank 300 and a sensor configuration for analysis. The System and Sensor configuration files and height-to-volume files are saved to the user's account. A user may then select applicable height-to-volume files, system files, and sensor configuration files to run an analysis at block 106. The analysis is then initiated at block 108. The system configuration selected by the user is read into the analysis program at block 110, and the sensor configuration is read into the analysis program at block 112. The tank height-to-volume information is read in at block 114. As noted in block 114 of FIG. 1A, the height-to-volume information varies with attitude because, generally speaking, a fuel tank may be geometrically non-linear resulting in different fuel plane height for every attitude of the same fuel quantity. Height-to-volume information may be obtained from a Computer Aided Design (CAD) model by placing the tank solid at a given attitude, and then slicing through the solid from top to bottom in incremental steps. Each slice is the volume of the solid at that height. If necessary, a conversion of the coordinates of the height-to-volume information must be performed at block 116 to agree with the coordinate system specified in the system configuration.

Figure 1B:
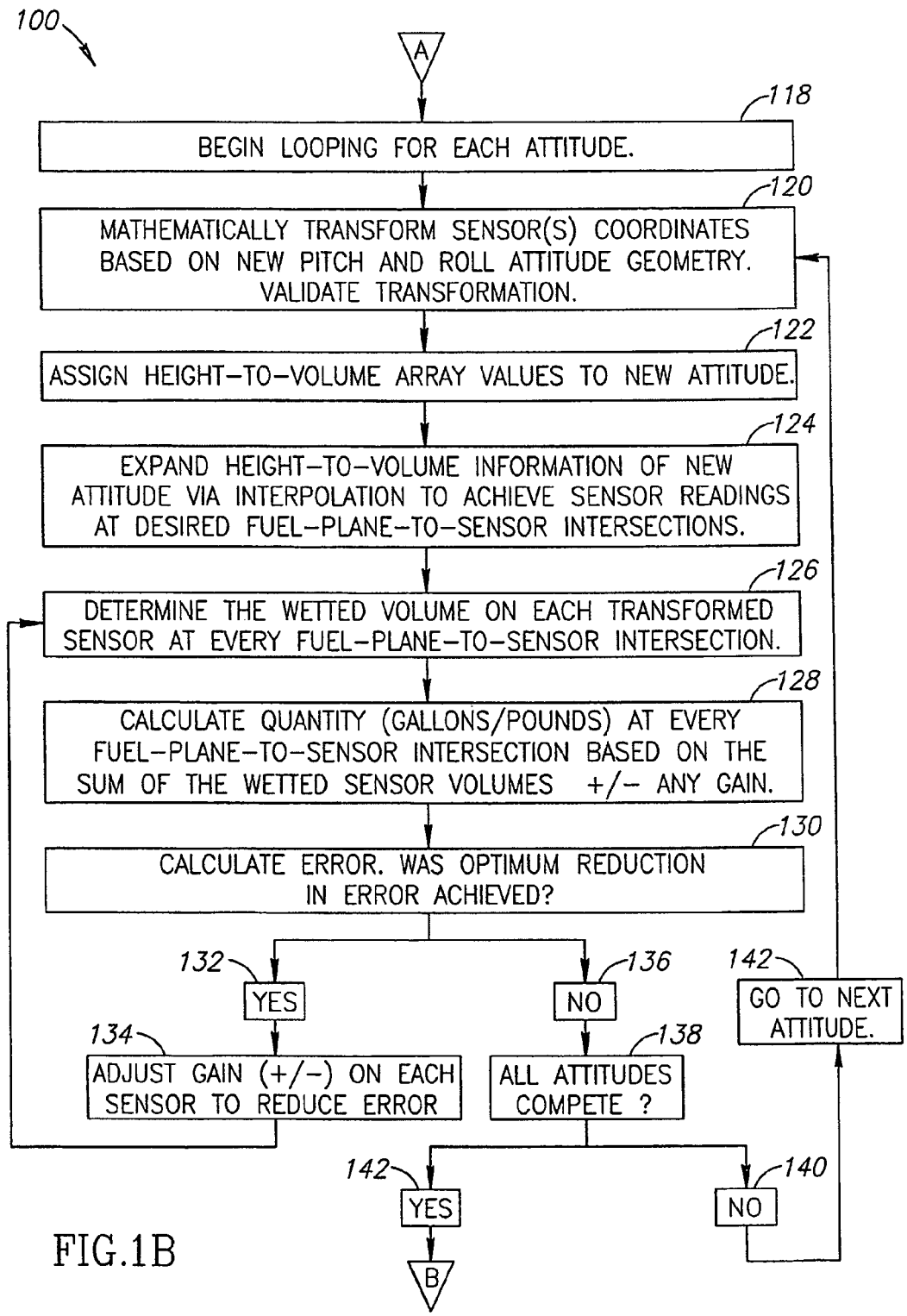

With reference to FIG. 1B, the method 100 continues by initiating an iteration loop, starting at the initial attitude at block 118 and continuing until all attitudes have been completed. The next step in the iteration loop, at block 120, mathematically transforms the coordinates of the sensor configuration based on new pitch and roll attitude geometry. A validation of the transformation is also performed at block 120. The method 100 further includes assigning height-to-volume array values to the new attitude at block 122. Next, at block 124, the height-to-volume information of the new attitude is expanded (via interpolation) to achieve sensor readings at one or more desired fuel (surface) plane-to-sensor intersections. A wetted volume on each transformed sensor (e.g. wetted volumes 316, 318, 320 corresponding to sensors 304, 306, 308 in FIG. 3) is determined at every fuel (surface) plane-to-sensor intersection (e.g. fuel plane 302 intersects sensors 304, 306, 308 at fuel plane-to-sensor intersections 310, 312, 314 in FIG. 3) at block 126. The quantity of fuel is calculated at block 128 for every fuel (surface) plane-to-sensor intersection 310, 312, 314 based on the sum of the wetted sensor volumes 316, 318, 320 plus or minus any gain.

As further shown in FIG. 1B, error is calculated to determine whether an optimum reduction of the error was achieved, at block 130. In one embodiment, the error is calculated by determining the sensor value (based on wetted area) at each level and comparing it to the actual (known) value the tank holds at that level. Any difference is error.

The optimization of the error is best explained by first describing how the sensor converts wetted area to quantity in at least one embodiment of the present invention. In one embodiment, a sensor consists of two or three concentric metal tubes. The sensors are electrically energized by a low voltage source (signal amplifier). As fuel covers the sensor, electrical current supplied by the amplifier is transferred from the inner to outer tube. The more that covers the sensor the greater the current transfer rate. This transfer rate is measured in capacitance (pF). The outer tube returns the capacitance value back to the signal amplifier which converts the value to quantity.

Optimization may then be conducted by changing the gap between the inner and outer tube to change the rate of capacitance or current transfer. This gap can be changed physically (e.g. inner tube is physically shaped) or electronically (e.g. inner tube diameter is constant). By determining the error (+/−) and applying a gain (loss) to the sensor, the gap can be electronically adjusted to increase or decrease its reading to minimize error. Optimization is adjusted throughout the entire sensor length to prevent an "overshoot" or illogical value (e.g. the sensor cannot read 10 gallons at 5 inches covered and 9.97 gallons at 5.03 inches covered).

If the optimum reduction in error was not achieved (block 132), then the method 100 includes a gain adjustment (plus or minus) on one or more of the sensors to reduce the error at block 134. The method 100 then returns to block 126 to repeat the actions set forth in blocks 126 through 130. If, however, the optimum reduction in error is achieved (block 136), then the method 100 determines whether all attitudes of interest have been computed at block 138. If all attitudes of interest have not been computed (block 140), then the next attitude is set, and the method 100 returns to block 120 and repeats the actions set forth in blocks 120 through block 140.

Figure 1C:
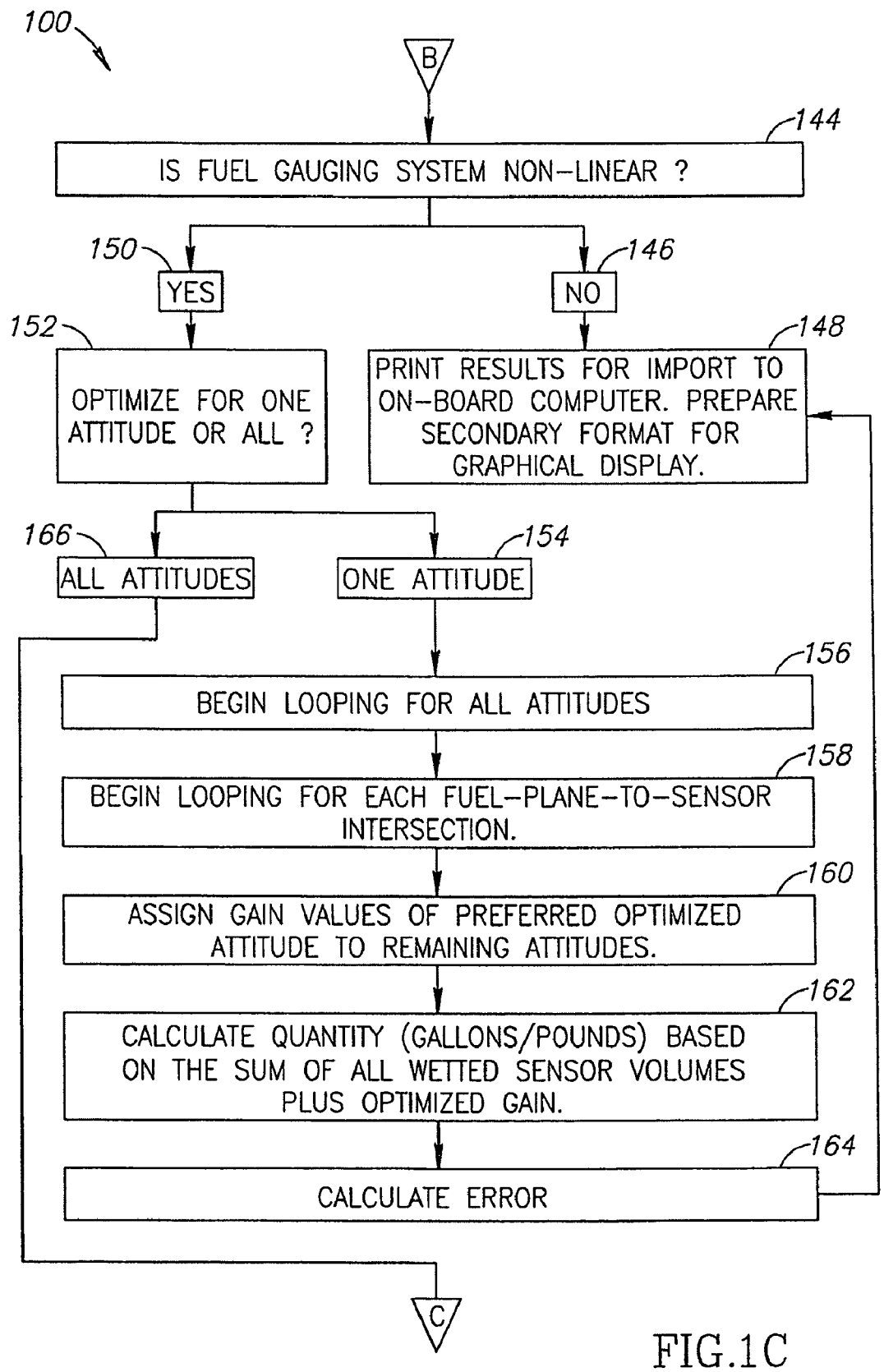

If all the attitudes of interest have been computed (block 142), then a determination is made regarding whether the fuel gauging system is non-linear at block 144, as shown in FIG. 1C. This determination may depend, for example, on the fact that sensors may be procured as non-linear or linear. If the result of this determination is negative, meaning a linear fuel gauging system (block 146), then the method 100 proceeds to output the computational results for import to an on-board computer at block 148. Furthermore, a secondary formatting of these results may also be prepared for graphical display at block 148.

With continued reference to FIG. 1C, if the fuel gauging system is determined to be non-linear (block 150), then the method 100 provides the option to optimize for one attitude or all attitudes of interest at block 152. If the user desires to optimize for only one attitude (block 154), then the method 100 begins iterating through all attitudes at block 156 in order to determine the errors based on the one selected attitude. It will be appreciated that optimization for only one attitude for a non-linear system permits the user to test a fixed value sensor—one that is optimized for only one attitude—against all other attitudes to get the resulting errors. Errors may be severe in this case, but it permits the user to determine if the errors are tolerable. At block 158, the method 100 begins iterating through each fuel (surface) plane-to-sensor intersection (e.g. fuel plane-to-sensor intersections 310, 312, 314 in FIG. 3). Gain values of a preferred optimized attitude are assigned to the remaining attitudes at block 160. The method 100 then calculates quantities of fuel based on the sum of all wetted sensor volumes (e.g. wetted volumes 316, 318, 320 corresponding to sensors 304, 306, 308 in FIG. 3) plus the optimized gain at block 162. An error is then calculated at block 164, and the method 100 proceeds to block 148 and outputs the computational results for import to an on-board computer (and also the secondary formatting for graphical display) at block 148.

Figure 1D:
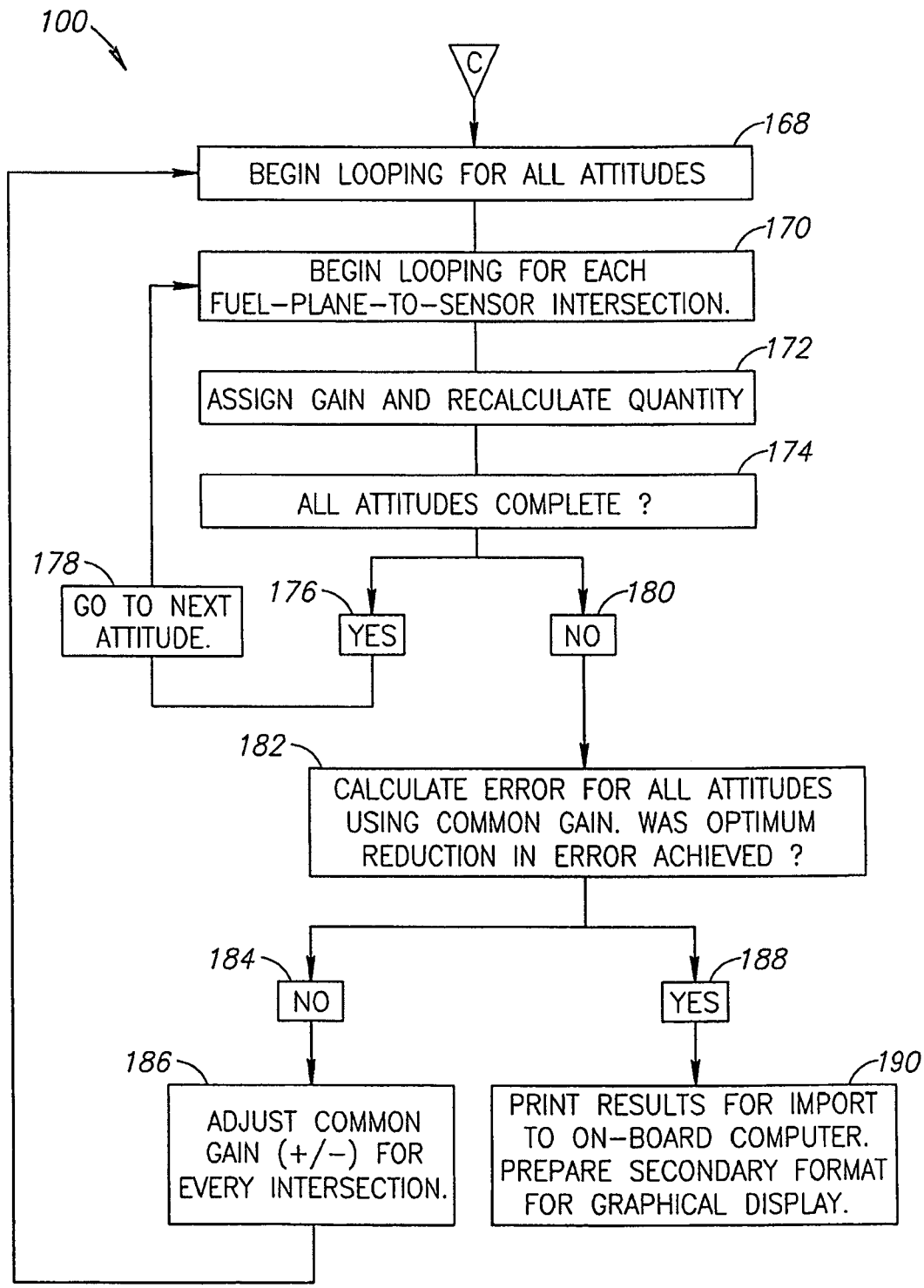

If it is determined at block 152 that the results are to be optimized for all attitudes (block 166), then the method 100 begins iterating through all attitudes at block 168, as shown in FIG. 1D. Similarly, the method 100 begins iterating through each fuel (surface) plane-to-sensor intersection at block 170. At block 172, a gain is assigned and fuel quantities are recalculated. The method 100 then determines whether all attitudes of interest have been completed at block 174. If not (block 176), then the method 100 increments to the next attitude at block 178, and the method 100 returns to the block 170 to repeat the actions set forth in blocks 170 through 174.

After all attitudes have been completed (block 180), the method 100 then calculates the error for all attitudes using a common gain, and determines whether an optimum reduction in error has been achieved, at block 182. If an optimum reduction in error has not been achieved (block 184), then a common gain is adjusted (plus or minus) for every intersection at block 186. The method 100 then returns to block 168 and repeats the actions set forth in blocks 168 through 182. If, however, at block 182 it was determined that an optimum reduction in error had been achieved (block 188), then the method 100 proceeds to a block 190 and prepares the computational results for import to an on-board computer, and also for secondary formatting of the results for graphical display.

Figure 2:
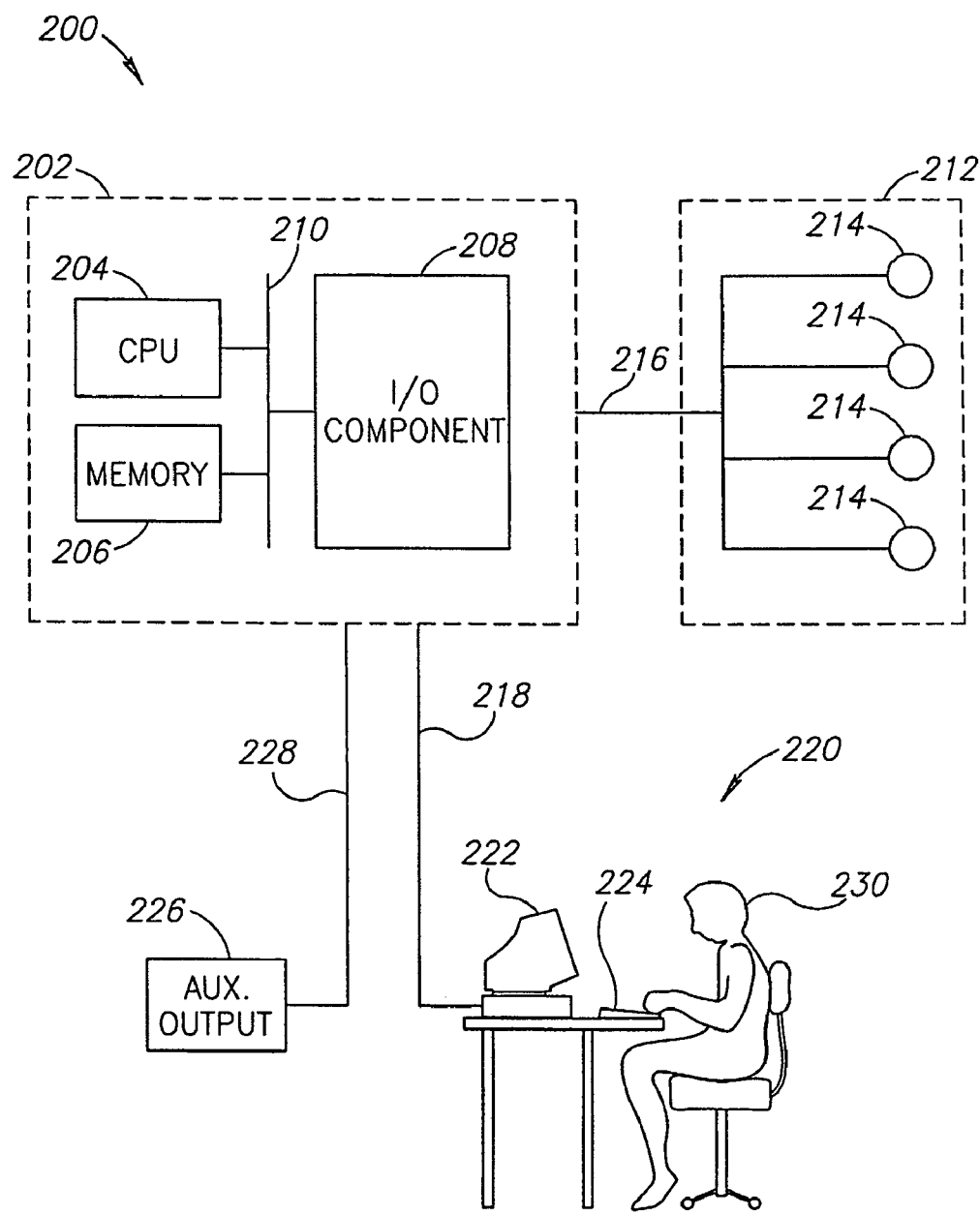
FIG. 2 is a representative system for predicting the accuracy of information supplied by sensors within fuel tanks during motion in accordance with another embodiment of the present invention.

A variety of systems may be conceived that may incorporate methods for predicting the accuracy of information supplied by sensors within fuel tanks experiencing motion with six degrees of freedom. For example, FIG. 2 is a representative system 200 for predicting the accuracy of information supplied by sensors within fuel tanks experiencing motion with six degrees of freedom in accordance with another embodiment of the present invention. Unless otherwise specified below, the components of the system 200 are of generally-known construction, and will not be described in detail. For the sake of brevity, only significant details and aspects of the system 200 will be described.

As shown in FIG. 2, in this embodiment, the system 200 includes a computer 202 having a Central Processing Unit (CPU) 204 and a memory component 206. The memory component 206 may include one or more memory modules, such as Random Access Memory (RAM) modules, Read Only Memory (ROM) modules, Dynamic Random Access Memory (DRAM) modules, and any other suitable memory modules. The computer 202 also includes Input/Output (I/O) components 208 that may include a variety of known I/O devices, including but not limited to, network connections, video and graphics cards, disk drives or other computer-readable media drives, displays, or any other suitable I/O modules. A data bus 210 operatively couples the CPU 204, memory component 206, and the I/O component 208.

The system 200 embodiment shown in FIG. 2 further includes a data storage component 212 operatively coupled to the computer 202. In this embodiment, the data storage component 212 includes a plurality of input files 214 that may be selected by a user 230 to perform simulation studies, as described more fully above. The data storage component 212 is operatively coupled to the computer 202 via a first communication link 216. In alternate embodiments, the data storage component 212 may be integral with the computer 202, or may be remotely situated with respect to the computer 202. In further embodiments, the input files 214 may be stored on the memory component 206 of the computer 202, and the data storage component 212 may be eliminated.

As further shown in FIG. 2, the system 200 further includes a control component 220 having a monitor 222 and a command input device 224 (e.g. a keyboard, an audio-visual input device, etc.). A second communication link 218 operatively couples the control component 220 to the computer 202. The system 200 also includes an auxiliary output device 226 coupled to the computer 202 by a third communication link 228. The auxiliary output device 226 may include a printer, a writeable Compact Disk (CD) device, a magnetic storage device, a communication port, or any other desired output device.

In one aspect, a machine-readable medium may be used to store a set of machine-readable instructions (e.g. a computer program) into the computer 202, wherein the machine-readable instructions embody a method for predicting the accuracy of information supplied by sensors within fuel tanks experiencing motion with six degrees of freedom in accordance with the teachings of the present invention. The machine-readable medium may be any type of medium which can store data that is readable by the computer 202, including but not limited to, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the system 200, including, for example, the I/O component 208, the memory component 206, the data storage component 212, and the auxiliary output device 226. Alternately, the machine-readable instructions may be implemented directly into one or more components of the computer 202, without the assistance of the machine-readable medium.

In operation, the computer 202 may be configured to perform one or more of the aspects of the methods for predicting the accuracy of information supplied by sensors within fuel tanks experiencing motion with six degrees of freedom described above with reference to FIGS. 1A through 1D. For example, an operator 230 may input a command through the command input device 224 to initiate the browser application, and to input one or more of the input files 214 described above. More specifically, the input files 214 may represent one or more of the system configuration files, the sensor configuration files, and the tank height-to-volume files, or any other inputs provided to and utilized by the method 100 described above and shown in FIG. 1.

For example, the input files 214 may be transmitted from the data storage component 212 to the computer 202. The computer 202 may be configured to perform the above-described method for predicting the accuracy of information supplied by sensors within fuel tanks experiencing motion with six degrees of freedom. In a preferred embodiment, a set of software instructions may be stored in the computer 202 (e.g. in the memory component 206) that causes the user inputs to be read into the memory component 206 and processed using the CPU 204 in accordance with the teachings herein, including one or more of the processes described above with respect to FIGS. 1A through 1D. Alternately, one or more aspects of the various processes described above may be implemented in the computer 202 using any suitable programmable or semi-programmable hardware components (e.g. Erasable Programmable Read Only Memory [EPROM] components).

Results of the analysis in accordance with one the present invention may be transmitted via the data bus 210 to the I/O component 208. The results may also be transmitted to the control component 220 and to the auxiliary output device 226 via the second and third communications links 218 and 228. The operator 230 may view the results of the analysis method(s) on the control monitor 222, and may take appropriate action, including revising analysis parameters and inputs, and continuing or repeating the one or more embodiments of analysis methods using different test data as desired.

Embodiments of methods and systems for predicting the accuracy of information supplied by sensors within fuel tanks experiencing motion with six degrees of freedom may provide significant advantages over the current methods. For example, embodiments of the present invention may allow a designer to rapidly perform computational simulations for a variety of system configurations, sensor configurations, etc. to predict the accuracy of information supplied by sensors within fuel tanks experiencing motion with six degrees of freedom. Since the designer may quickly and efficiently perform iteration studies of various sensor configurations using methods and systems in accordance with the present invention, the relatively higher costs associated with trial-and-error experimental studies may be reduced or eliminated. Thus, improved system designs may be achieved at lower cost in comparison with current trial-and-error methods.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of simulating a volume of liquid within a tank during motion, comprising:
    receiving tank geometry information;
    receiving sensor configuration information;
    receiving tank motion information;
    computing one or more fuel-plane-to-sensor intersections for at least one tank position based on the tank motion information;
    computing one or more wetted volumes, each wetted volume being computed at a fuel-plane-to-sensor intersection for each sensor location based on the sensor configuration information;
    computing a fuel quantity at every fuel-plane-to-sensor intersection based on a sum of the one or more wetted volumes;
    computing an error for each computation of fuel quantity;
    comparing the error with at least one previously computed error; and
    at least one of storing, transmitting, and displaying one or more of the computed fuel quantities and the computed errors.

2. The method of claim 1, further comprising adjusting a gain of at least one of the sensors based on the comparison between the error and the previously computed error, and repeating the computing of the wetted volumes, the computing of the fuel quantities, the computing of the error, and the comparing of the error.

3. The method of claim 1 wherein receiving tank geometry information includes receiving height-to-volume values.

4. The method of claim 1 wherein receiving tank geometry information includes receiving an input file of height-to-volume values from a storage device, the height-to-volume values being obtained by incrementally slicing through a computer aided design model of the tank at a given attitude, each slice being an incremental volume of the tank.

5. The method of claim 1, wherein computing one or more fuel-plane-to-sensor intersections includes interpolating the height-to-volume information from the tank geometry information to a desired attitude.

6. The method of claim 1, wherein computing one or more fuel-plane-to-sensor intersections includes mathematically transforming sensor coordinates from the sensor configuration information.

7. The method of claim 1, wherein computing one or more errors includes computing one or more errors for each computation of wetted volume, the method further comprising determining a non-linearity condition of a fuel gauging system based on one or more of the computed errors.

8. The method of claim 7, further comprising optimizing the error for a single motion condition if the fuel gauging system is non-linear.

9. The method of claim 8, wherein the single motion condition includes a single attitude.

10. The method of claim 7, further comprising optimizing the error for a plurality of motion conditions if the fuel gauging system is non-linear.

11. The method of claim 10, wherein the plurality of motion conditions includes a plurality of attitudes.

12. A computer-readable medium encoded with a computer program product for simulating a volume of liquid within a tank during motion, comprising:
    a first computer program portion adapted to receive tank geometry information;
    a second computer program portion adapted receive sensor configuration information;
    a third computer program portion adapted to receive tank motion information;
    a fourth computer program portion adapted to compute one or more fuel-plane-to-sensor intersections for at least one tank position based on the tank motion information;
    a fifth computer program portion adapted to compute one or more wetted volumes, each wetted volume being computed at a fuel-plane-to-sensor intersection for each sensor location based on the sensor configuration information;
    a sixth computer program portion adapted to compute a fuel quantity at every fuel-plane-to-sensor intersection based on a sum of the one or more wetted volumes; and
    a seventh computer program portion adapted to compute an error for each computation of fuel quantity, and to compare the error with at least one previously computed error, and to at least one of store, transmit, and display one or more of the computed fuel quantities and the computed errors.

13. The computer-readable medium of claim 12, further comprising an eighth computer program portion adapted to adjust a gain of at least one of the sensors based on the comparison between the error and the previously computed error.

14. The computer-readable medium of claim 12, wherein the first computer program portion is adapted to receive height-to-volume values.

15. The computer-readable medium of claim 12, wherein the fourth computer program portion is adapted to interpolate height-to-volume information from the tank geometry information to a desired attitude.

16. The computer-readable medium of claim 12, wherein the seventh computer program portion if further adapted to determine a non-linearity condition of a fuel gauging system based on one or more of the computed errors.

17. The computer-readable medium of claim 16, further comprising an eighth computer program portion adapted to optimize the error for at least one motion condition if the fuel gauging system is non-linear.

18. The computer-readable medium of claim 17, wherein the at least one motion condition includes an attitude.

19. A system for simulating a volume of liquid within a tank during motion, comprising:
    a control component;
    an input/output device coupled to receive input data; and
    a processor arranged to analyze the input data, the processor including:
        a first portion adapted to receive tank geometry information;
        a program portion adapted receive sensor configuration information;

a third portion adapted to receive tank motion information;

a fourth portion adapted to compute one or more fuel-plane-to-sensor intersections for at least one tank position based on the tank motion information;

a fifth portion adapted to compute one or more wetted volumes, each wetted volume being computed at a fuel-plane-to-sensor intersection for each sensor location based on the sensor configuration information;

a sixth portion adapted to compute a fuel quantity at every fuel-plane-to-sensor intersection based on a sum of the one or more wetted volumes; and a seventh portion adapted to compute an error for each computation of fuel quantity, and to compare the error with at least one previously computed error and to at least one of store, transmit, and display one or more of the computed fuel quantities and the computed errors.

20. The system of claim 19, wherein the processor further includes a seventh portion adapted to adjust a gain of at least one of the sensors based on the comparison between the error and the previously computed error.

21. The system of claim 19, wherein the first portion is adapted to receive height-to-volume values.

22. The system of claim 19, wherein the fourth portion is adapted to interpolate height-to-volume information from the tank geometry information to a desired attitude.

23. The system of claim 19, wherein the seventh portion is further adapted to determine a non-linearity condition of a fuel gauging system based on one or more of the computed errors.

24. The system of claim 23, wherein the processor further includes an eighth portion adapted to optimize the error for at least one motion condition if the fuel gauging system is non-linear.

25. The system of claim 24, wherein the at least one motion condition includes an attitude.

* * * * *